United States Patent
Xie et al.

(10) Patent No.: US 12,457,580 B2
(45) Date of Patent: Oct. 28, 2025

(54) SERVICE INDICATION METHOD AND DEVICE

(71) Applicant: VIVO MOBILE COMMUNICATION CO., LTD., Guangdong (CN)

(72) Inventors: Zhenhua Xie, Guangdong (CN); Xiaowan Ke, Guangdong (CN); Wen Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 411 days.

(21) Appl. No.: 17/676,356

(22) Filed: Feb. 21, 2022

(65) Prior Publication Data

US 2022/0174645 A1    Jun. 2, 2022

Related U.S. Application Data

(63) Continuation of application No. PCT/CN2020/111712, filed on Aug. 27, 2020.

(30) Foreign Application Priority Data

Aug. 27, 2019    (CN) .......................... 201910798427.3

(51) Int. Cl.
*H04W 68/02*    (2009.01)
(52) U.S. Cl.
CPC .................... *H04W 68/02* (2013.01)
(58) Field of Classification Search
CPC ..... H04W 68/02; H04W 68/00; H04W 76/27; H04W 76/28; H04W 76/10; H04W 60/04; H04W 88/02; H04W 76/11; H04W 24/02; H04W 24/10; H04W 68/025
See application file for complete search history.

(56) References Cited

U.S. PATENT DOCUMENTS

| | | | |
|---|---|---|---|
| 2016/0021516 | A1 | 1/2016 | Han |
| 2017/0359800 | A1 | 12/2017 | Cui et al. |
| 2018/0014275 | A1* | 1/2018 | Fujishiro ........... H04W 52/0216 |

(Continued)

FOREIGN PATENT DOCUMENTS

| | | |
|---|---|---|
| CN | 1937839 A | 3/2007 |
| CN | 102573065 A | 7/2012 |

(Continued)

OTHER PUBLICATIONS

SA WG2, "New SID: Study on system enablers for multi-SIM devices", TSG SA Meeting #SP-82, SP-181235, Dec. 12-14, 2018, Sorrento, Italy.

(Continued)

*Primary Examiner* — Kwasi Karikari
(74) *Attorney, Agent, or Firm* — Price Heneveld LLP

(57) ABSTRACT

Embodiments of this disclosure provide a service indication method and a device to resolve a problem that a matching value related to a service cannot be set in the related art. The method is executed by a network function and includes: receiving matching information specific to a user, or sending the matching information specific to the user to a terminal device of the user, where the matching information includes one or more matching values, and one of the matching values corresponds to one or more services or corresponds to one or more service types.

18 Claims, 8 Drawing Sheets

(56) References Cited

U.S. PATENT DOCUMENTS

| | | |
|---|---|---|
| 2018/0262979 A1 | 9/2018 | Wang et al. |
| 2019/0007500 A1 | 1/2019 | Kim et al. |
| 2019/0174406 A1 | 6/2019 | Dwang et al. |
| 2019/0199802 A1 | 6/2019 | Zhu et al. |
| 2020/0021970 A1* | 1/2020 | Lu .......................... H04W 8/08 |
| 2021/0058827 A1* | 2/2021 | Holmström ....... H04W 28/0263 |
| 2021/0092634 A1 | 3/2021 | Kang |

FOREIGN PATENT DOCUMENTS

| | | |
|---|---|---|
| CN | 104811960 A | 7/2015 |
| CN | 108990117 A | 12/2018 |
| CN | 109189553 A | 1/2019 |
| CN | 109257769 A | 1/2019 |
| JP | 2015526997 A | 9/2015 |
| WO | 2013014000 A1 | 1/2013 |
| WO | 2017079906 A1 | 5/2017 |
| WO | 2017210888 A1 | 12/2017 |
| WO | 2019103462 A1 | 5/2019 |

OTHER PUBLICATIONS

OPPO, "Updating of solution#1 in TR23.761", SA WG2 Meeting #136 AH, S2-2000309, Jan. 13-17, 2020, Incheon, Korea.

Intel et al., "Enhancements for Dual Registration mode of operation", SA WG2 Meeting #128, S2-186373, Jul. 2-6, 2018, Vilnius, Lithuania.

China Telecom, "Motivation for SI on multi-SIM devices in RAN", 3GPP TSG RAN Meeting #83, RP-190248, Shenzhen, China, Mar. 18-21, 2019.

Huawei, "Terminology rationalisation and SLA simplification for network slicing", SA WG2 Meeting #124, S2-179433, Nov. 27-Dec. 1, 2017 Reno, U.S. of America.

Intel, Qualcomm Inc., Lenovo, Motorola Mobility, "Enhancements for Dual Registration mode of operation", S2-186372, Sa WG2 Meeting #128, Jul. 2-6, 2018, Vilnius, Lithuania.

"3rd Generation Partnership Project; Technical Specification Group Services and System Aspects; Procedures for the 5G System; Stage 2 (Release 16)", 3GPP Ts 23.502 V16.1.1 (2019-06), Valbonne, France.

* cited by examiner

100

Receive matching information specific to a user, or send the matching information specific to the user to a terminal device of the user, where the matching information may include one or more matching values, and one of the matching values may correspond to one or more services or correspond to one or more service types ~ S102

Send, to a network, matching information specific to a user of a terminal device, or receive, from the network, the matching information specific to the user of the terminal device, where the matching information may include one or more matching values, and one of the matching values may correspond to one or more services or correspond to one or more service types   ~ S702

FIG. 7

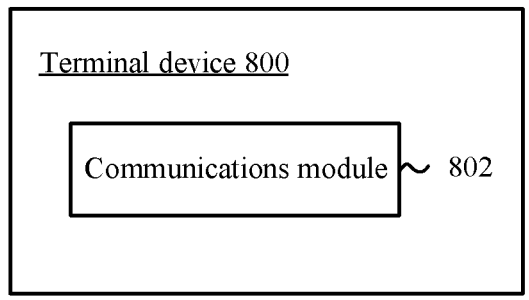

FIG. 8

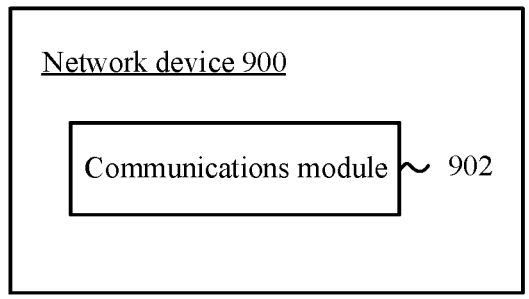

FIG. 9

SERVICE INDICATION METHOD AND DEVICE

CROSS-REFERENCE TO RELATED APPLICATIONS

This application is a continuation application of International Application No. PCT/CN2020/111712 filed on Aug. 27, 2020, which claims priority to Chinese Patent Application No. 201910798427.3, filed in China on Aug. 27, 2019, which are incorporated herein by reference in their entireties.

TECHNICAL FIELD

Embodiments of this disclosure relate to the communications field, and in particular, to a service indication method and a device.

BACKGROUND

The 3rd generation partnership project (3GPP) defines a procedure of paging a user in a mobile terminated service of a mobile network. The specific procedure is as follows: An application server sends application data; after the application data reaches a user plane function (UPF), the UPF sends a downlink data notification to a session management function (SMF); the SMF sends a paging request message to an access and mobility management function (AMF); the AMF sends a paging message to a terminal device through a base station; and after receiving the paging message, the terminal device initiates a service request for establishing a connection with the mobile network.

In the related art, a paging message sent by a base station to a terminal device may carry a matching value. However, the matching value is not related to a service. Therefore, how to set a matching value related to a service is a technical problem that needs to be urgently resolved in the related art.

SUMMARY

Embodiments of this disclosure are intended to provide a service indication method and a device, to resolve the problem that a matching value related to a service cannot be set in the related art.

According to a first aspect, a service indication method is provided, where the method is executed by a network function and includes:
receiving matching information specific to a user, or sending the matching information specific to the user to a terminal device of the user, where
the matching information includes one or more matching values, and one of the matching values corresponds to one or more services or corresponds to one or more service types.

According to a second aspect, a service indication method is provided, where the method is executed by a terminal device and includes:
sending, to a network, matching information specific to a user of the terminal device, or receiving, from the network, the matching information specific to the user of the terminal device, where
the matching information includes one or more matching values, and one of the matching values corresponds to one or more services or corresponds to one or more service types.

According to a third aspect, a terminal device is provided, where the terminal device includes:
a communications module, configured to send, to a network, matching information specific to a user of the terminal device, or receive, from the network, the matching information specific to the user of the terminal device, where
the matching information includes one or more matching values, and one of the matching values corresponds to one or more services or corresponds to one or more service types.

According to a fourth aspect, a network device is provided, where the network device includes:
a communications module, configured to receive matching information specific to a user, or send the matching information specific to the user to a terminal device of the user, where
the matching information includes one or more matching values, and one of the matching values corresponds to one or more services or corresponds to one or more service types.

According to a fifth aspect, a terminal device is provided, where the terminal device includes a processor, a memory, and a computer program stored in the memory and capable of running on the processor, where when the computer program is executed by the processor, the steps of the service indication method according to the second aspect are implemented.

According to a sixth aspect, a network device is provided, where the network device includes a processor, a memory, and a computer program stored in the memory and capable of running on the processor, where when the computer program is executed by the processor, the steps of the service indication method according to the first aspect are implemented.

According to a seventh aspect, a computer-readable storage medium is provided, where the computer-readable storage medium stores a computer program, and when the computer program is executed by a processor, the steps of the service indication methods according to the first aspect and the second aspect are implemented.

In the embodiments of this disclosure, the network function may receive the matching information specific to the user, or may send the matching information to the terminal device, where the matching information includes one or more matching values, and one of the matching values corresponds to one or more services or service types. This resolves the problem that the matching value related to the service cannot be set in the related art, and improves communication effectiveness.

BRIEF DESCRIPTION OF DRAWINGS

To describe the technical solutions in embodiments of this disclosure more clearly, the following briefly describes the accompanying drawings required for describing the embodiments of this disclosure. A person of ordinary skill in the art may derive other drawings from these accompanying drawings without creative efforts.

FIG. 1 is a schematic flowchart of a service indication method according to an embodiment of this disclosure;

FIG. 7 is a schematic flowchart of a service indication method according to another embodiment of this disclosure;

FIG. 8 is a schematic structural diagram of a terminal device according to an embodiment of this disclosure;

FIG. 9 is a schematic structural diagram of a network device according to an embodiment of this disclosure;

DESCRIPTION OF EMBODIMENTS

Figure 2:
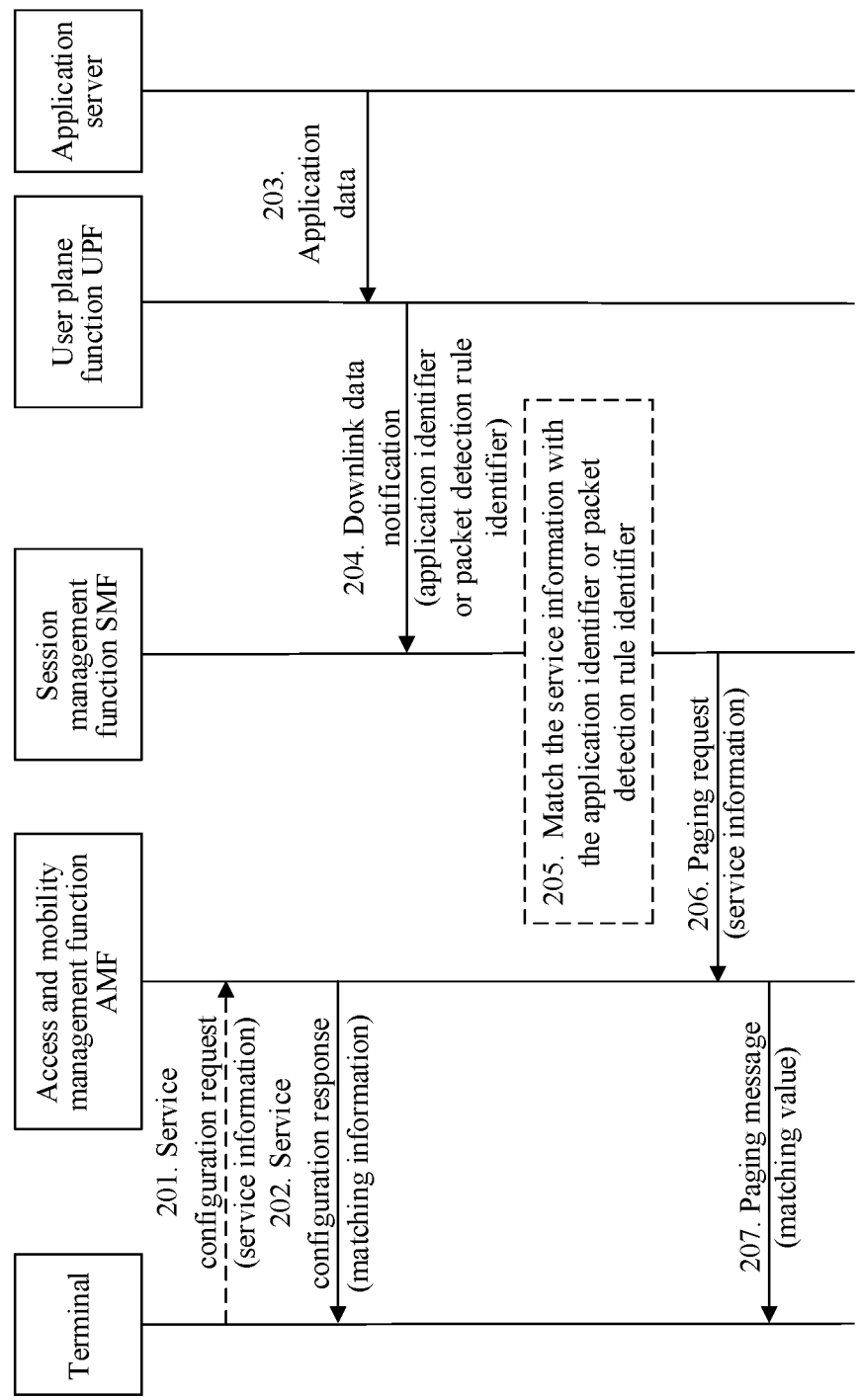
FIG. 2 to FIG. 6 are schematic flowcharts of a service indication method according to several specific embodiments of this disclosure.

To make the objectives, technical solutions, and beneficial technical effects of this application clearer, this disclosure is described below in detail with reference to specific embodiments. It should be understood that the embodiments described in this specification are merely intended to interpret this disclosure, but not intended to limit this disclosure.

For simplicity, only some numerical ranges are explicitly disclosed herein. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the descriptions of this specification, it should be noted that "more than" or "less than" is inclusive of the present number and that "more" in "one or more" means two or more than two, unless otherwise specified.

The foregoing invention content of this disclosure is not intended to describe each of the disclosed embodiments or implementations of this disclosure. The following description illustrates example embodiments in more detail by using examples. Throughout this application, guidance is provided by using a series of embodiments and the embodiments may be used in various combinations. In the examples, enumeration is only representative but should not be interpreted as exhaustive.

It should be understood that the technical solutions in the embodiments of this disclosure may be applied to various communications systems, such as a long term evolution (LTE) system, an LTE frequency division duplex (FDD) system, an LTE time division duplex (TDD) system, a Universal Mobile Telecommunications System (UMTS), a worldwide interoperability for microwave access (WiMAX) communications system, or a 5G system or a new radio (NR) system, or a later evolved communications system.

In the embodiments of this disclosure, a terminal device may include but is not limited to a mobile station (MS), a mobile terminal, a mobile telephone, user equipment (UE), a handset, portable equipment, a vehicle, and the like. The terminal device may communicate with one or more core networks via a radio access network (RAN). For example, the terminal device may be a mobile phone (or referred to as a "cellular" phone), or a computer having a wireless communication function. The terminal device may alternatively be a portable, pocket-sized, handheld, computer built-in, or in-vehicle mobile apparatus.

In the embodiments of this disclosure, a network device is an apparatus deployed in the radio access network and configured to provide a wireless communication function for the terminal device. The network device may be a base station. The base station may include a macro base station, a micro base station, a relay station, an access point, and the like in various forms. Devices having base station functions may have different names in systems using different radio access technologies, For example, in an LTE network, the device having the function of the base station is referred to as an evolved NodeB (evolved NodeB, eNB or eNodeB), in a third generation (3G) network, the device having the function of the base station is referred to as a NodeB, or the device having the function of the base station is referred to as the network device in the later evolved communications system, or the like. However, wording does not constitute a limitation.

As shown in FIG. 1, an embodiment of this disclosure provides a service indication method 100. The method may be executed by a network function, for example, by an AMF, an SMF, or a UPF. In other words, the method may be executed by a network function on a network side. The method includes the following steps.

S102: Receive matching information specific to a user, or send the matching information specific to the user to a terminal device of the user, where the matching information may include one or more matching values, and one of the matching values may correspond to one or more services or corresponds to one or more service types.

The user may be specifically determined through a universal subscriber identity module (USIM), and one user corresponds to one USIM.

The matching information may include one or more matching relationships, where any one of the matching relationships (which is, for ease of distinguishing, referred to as a target matching relationship) may include a target matching value and at least one of the following:

(1) one or more pieces of target service information, where the target service information is used to indicate a service related (or corresponding) to the target matching value;

(2) one or more pieces of target service type information, where the target service type information is used to indicate a service type related (or corresponding) to the target matching value;

(3) one or more pieces of high-priority service information that corresponds to target service information, where a service corresponding to the high-priority service information is capable of preempting a service corresponding to the target service information;

(4) one or more pieces of high-priority service type information that corresponds to target service type information, where a service corresponding to the high-priority service type information is capable of preempting a service corresponding to the target service type information;

(5) one or more pieces of low-priority service information that corresponds to target service information, where a service corresponding to the low-priority service information is incapable of preempting a service corresponding to the target service information;

(6) one or more pieces of low-priority service type information that corresponds to target service type information, where a service corresponding to the low-priority service type information is incapable of preempting a service corresponding to the target service type information;

(7) priority information of a service corresponding to the target service information;

(8) priority information of a service type corresponding to the target service type information;
(9) initiator information of a service corresponding to the target service information; and
(10) initiator information of a service of a service type corresponding to the target service type information.

Generally, one matching relationship may include one matching value, and different matching relationships include different matching values.

Optionally, the matching information further includes validity period information.

It should be noted that the target matching relationship herein is merely an example. Actually, one or more matching relationships included in the matching information may be all shown in the foregoing example.

It should also be noted that for the "target . . . " mentioned in the embodiments of this specification, for example, the target service information, the word "target" is merely intended to facilitate description of one specific service information, and does not represent other specific meanings.

The service information and/or service type information mentioned in the embodiments of this specification may specifically include at least one of:
(1) a name such as WeChat, an instant messaging service voice call, an instant messaging service type, and a gaming type;
(2) an identifier, for example, 1 corresponds to WeChat, 2 corresponds to an instant messaging service voice call, 3 corresponds to an instant messaging service type, and 4 corresponds to a gaming type; and
(3) rule information, where the rule information includes at least one of the following: a rule identifier and one or more IP addresses, where the IP address may include a number or a wildcard; one or more port numbers, where the port number may include a number or a wildcard; one or more pieces of protocol information (for example, RTP based on TCP); and one or more pieces of codec information, for example, a voice service can be identified by voice code, and a video service can be identified by video codec.

Generally, the service information includes a service name such as WeChat and an instant messaging service voice call; and the service type information includes a service type name such as an instant messaging service type and a gaming type. Generally, the service information includes a service identifier, for example, 1 corresponds to WeChat, and 2 corresponds to an instant messaging service voice call; and the service type information includes a service type identifier, for example, 1 corresponds to an instant messaging service type, and 2 corresponds to a gaming type.

Generally, the service information includes service rule information, for example, rule information of one or more services; and the service type information includes service type rule information, for example, rule information of one or more service types.

The matching values mentioned in the embodiments of this specification may be randomly generated, or may be calculated by using a hash function.

In the service indication method provided in this embodiment of this disclosure, the network function may receive the matching information specific to the user, or may send the matching information to the terminal device. The matching information includes one or more matching values, and one of the matching values corresponds to one or more services or service types. This resolves the problem that the matching value related to the service cannot be set in the related art, and improves communication effectiveness.

With the foregoing S102, the process of determining the matching information through negotiation between the terminal device (or the terminal for short) and the network function is actually implemented. In a subsequent process, optionally, the network function may further receive a message related to data of the target service or the target service type, or receive the data of the target service or the target service type; and send a target matching value to the terminal device (the target matching value mentioned in this embodiment may be different from the target matching value mentioned above), where the target matching value corresponds to the target service or the target service type, and the message is triggered by the data of the target service or the target service type.

The above-mentioned data of the target service may also be referred to as target service data; and the above-mentioned message related to the data of the target service may be, for example, a downlink data notification such as a DL data notify message, and specifically, may be a WeChat notification message, an instant messaging service voice call notification message, or the like.

The above-mentioned data of the target service type may also be referred to as target service type data; and the above-mentioned message related to the data of the target service type may be, for example, a downlink data notification such as a DL data notify message, and specifically, may be an instant messaging service notification message, a gaming notification message, or the like.

Optionally, the target matching value sent to the terminal device is carried in a paging message, and a terminal device side also stores the matching information. In this way, the terminal device may further determine, based on the target matching value, whether to respond to the paging message. In addition, this resolves the related-art problem that the terminal device cannot determine whether to receive paging, thereby improving communication flexibility.

Optionally, in the foregoing embodiment, after receiving the message related to the data of the target service or the target service type or receiving the data of the target service or the target service type, the network function may further determine, based on service information or service type information corresponding to a currently active service of the terminal device, the matching information, and one of the target service or the target service type, to refuse to send the target matching value. Certainly, in this embodiment, the network function may also pre-receive the service information or service type information corresponding to the currently active service of the terminal device.

For example, if a priority of the currently active service of the terminal device is higher than a priority of a service corresponding to the target service data, the network function refuses to send the target matching value.

In an implementation, the matching information mentioned in the foregoing embodiment 100 may be determined by the network function, so that the network function may further receive a request message from the terminal device, where the request message includes one or more pieces of service information or one or more pieces of service type information, the service information is used to indicate the service, and the service type information is used to indicate the service type; and generate a corresponding matching value for the service information or the service type information.

In another implementation, the matching information mentioned in the foregoing embodiment 100 may be determined by a terminal, so that the network function may further send a request message to the terminal device of the user, where the request message includes one or more pieces of service information or one or more pieces of service type information, the service information is used to indicate the service, and the service type information is used to indicate the service type.

Optionally, the request message mentioned in the above two implementations further includes at least one piece of the following information corresponding to target service information or target service type information:

- one or more pieces of high-priority service information, where a service corresponding to the high-priority service information is capable of preempting a service corresponding to the target service information;
- one or more pieces of high-priority service type information, where a service corresponding to the high-priority service type information is capable of preempting a service corresponding to the target service type information;
- one or more pieces of low-priority service information, where a service corresponding to the low-priority service information is incapable of preempting a service corresponding to the target service information;
- one or more pieces of low-priority service type information, where a service corresponding to the low-priority service type information is incapable of preempting a service corresponding to the target service type information;
- priority information of a service corresponding to the target service information;
- priority information of a service type corresponding to the target service type information;
- initiator information of a service corresponding to the target service information; and
- initiator information of a service of a service type corresponding to the target service type information.

In order to describe in detail the service indication method provided in this embodiment of this disclosure, the following provides description with reference to several specific embodiments.

Embodiment 1

In this embodiment, a network device may assign a matching value to each service and/or each service type. As shown in FIG. 2, this embodiment may include the following steps: step 201 to step 207.

Step 201 (this step is optional): A terminal device (or terminal for short) sends a service configuration request message to an AMF through a non-access stratum (NAS) message, for example, sends a UL NAS message or a registration request message, where the service configuration request message may carry a service information list, and the service information list may include one or more pieces of service information and/or one or more pieces of service type information.

Optionally, the service configuration request message may carry validity period information, and the validity period information may indicate that related information is to be updated before expiration, for example, steps 201 and 202 are executed again, or step 202 is executed again to update the related information.

Optionally, the service configuration request message may further include: priority information of a service corresponding to each piece of service information, or one or more pieces of high-priority service information corresponding to each piece of service information, or one or more pieces of low-priority service information corresponding to each piece of service information. The plurality of pieces of service information may correspond to the same one or more pieces of high-/low-priority service information.

Optionally, the service configuration request message may further include: priority information of a service type (or service) corresponding to each piece of service type information, or one or more pieces of high-priority service type information corresponding to each piece of service type information, or one or more pieces of low-priority service type information corresponding to each piece of service type information. The plurality of pieces of service type information may correspond to the same one or more pieces of high-/low-priority service type information.

A service indicated by the high-priority service information is allowed to preempt a service indicated by the one or more pieces of service information corresponding to the high-priority service information; and a service indicated by the low-priority service information is not allowed to interfere with a service indicated by the one or more pieces of service information corresponding to the low-priority service information.

A service indicated by the high-priority service type information is allowed to preempt a service indicated by the one or more pieces of service type information corresponding to the high-priority service type information; and a service indicated by the low-priority service type information is not allowed to interfere with a service indicated by the one or more pieces of service type information corresponding to the low-priority service type information.

The service information or high-/low-priority service information may include a service name such as WeChat, QQ, an instant messaging service voice call (IMS Voice call), an instant messaging service video call (IMS Video call), and a game name; or may include a name and/or an identifier of a service type, for example, service type identifier 1 corresponds to a service type name "instant messaging service" such as WeChat or QQ, service type identifier 2 corresponds to a service type name "IMS" such as a voice call or a video call, and service type identifier 3 corresponds to a service type name "gaming"; or may include a service identifier, for example, 1 corresponds to WeChat, 2 corresponds to IMS voice call, and 3 corresponds to QQ.

Optionally, the service information or high-/low-priority service information may further include session identifiers and/or flow identifiers (that is, session identifiers+flow identifiers, session identifiers, or flow identifiers) corresponding to all services during session establishment of the terminal, or may include service initiator information such as a calling number of the IMS.

When the service information/the service type information includes a session identifier and/or a flow identifier, in a subsequent process, the AMF may further query an SMF for a service identifier, service name, service type identifier, service type name, or the like corresponding to the session identifier and/or the flow identifier, so as to obtain a correspondence between matching values and services/service types.

Step 202: The AMF sends a service configuration response message to the terminal by using a NAS message, for example, sends a DL NAS message or a registration accept message, where the service configuration response message may carry one or more matching relationships, such as a policy matching relationship or a cause matching relationship. Optionally, the service configuration response message may also carry validity period information.

Actually, step 201 in this embodiment may be executed or omitted, and step 202 is described in two cases below.

If step 201 is not executed in this embodiment, matching information includes at least a matching value (which is, for example, a policy identifier in the policy matching relationship, and a cause value in the cause matching relationship) and one or more pieces of service information/service type information corresponding to the matching value.

If the matching information is policy matching information, the matching information may further include: priority information of a service corresponding to each piece of service information, or one or more pieces of high-priority service information corresponding to each piece of service information, or one or more pieces of low-priority service information corresponding to each piece of service information. The plurality of pieces of service information may correspond to the same one or more pieces of high-/low-priority service information.

If the matching information is policy matching information, the matching information may further include: priority information of a service type corresponding to each piece of service type information, or one or more pieces of high-priority service type information corresponding to each piece of service type information, or one or more pieces of low-priority service type information corresponding to each piece of service type information. The plurality of pieces of service type information may correspond to the same one or more pieces of high-/low-priority service type information.

Optionally, the policy identifier or the cause value may be randomly generated, or generated by using other calculation methods, for example, by using a hash function, so that there is no regularity among a plurality of policy identifiers or a plurality of cause values. If one matching value corresponds to a plurality of pieces of service information/service type information, it can be expressed that the plurality of pieces of service information/service type information correspond to a same matching value. For descriptions of the service information and the high-/low-priority service information, refer to step 201.

If step 201 is executed in this embodiment, matching information includes at least matching values, and an order of the matching values may be the same as an order of service information/the service type information in the service information list in step 201, so that the matching values match the service information/the service type information.

Optionally, the matching information may further include a sequence number of the service information in step 201, so that all or part of the service information/the service type information can be matched. For example, a network device does not support identifying services indicated by some service information/service type information in step 201, matching values of the services are not provided.

Certainly, the matching information may further include one or more pieces of service information/service type information corresponding to the matching value, and the service information/service type information in the matching information may be a subset or a universal set of all the service information/service type information in step 201.

If the matching information is policy matching information, the matching information may further include: priority information of a service corresponding to each piece of service information, or one or more pieces of high-priority service information corresponding to each piece of service information, or one or more pieces of low-priority service information corresponding to each piece of service information. The plurality of pieces of service information may correspond to the same one or more pieces of high-/low-priority service information.

If the matching information is policy matching information, the matching information may further include: priority information of a service type corresponding to each piece of service type information, or one or more pieces of high-priority service type information corresponding to each piece of service type information, or one or more pieces of low-priority service type information corresponding to each piece of service type information. The plurality of pieces of service type information may correspond to the same one or more pieces of high-/low-priority service type information.

Optionally, the policy identifier or the cause value may be randomly generated, or generated by using other calculation methods, for example, by using a hash function, so that there is no regularity among a plurality of policy identifiers or a plurality of cause values.

If one matching value corresponds to a plurality of pieces of service information, it can be expressed that the plurality of pieces of service information correspond to a same matching value, or that sequence numbers of the plurality of pieces of service information correspond to a same matching value. The plurality of pieces of service information may correspond to the same one or more pieces of high-/low-priority service information.

If one matching value corresponds to a plurality of pieces of service type information, it can be expressed that the plurality of pieces of service type information correspond to a same matching value, or that sequence numbers of the plurality of pieces of service type information correspond to a same matching value. The plurality of pieces of service type information may correspond to the same one or more pieces of high-/low-priority service type information.

When the service information/the service type information includes a session identifier and/or a flow identifier, the AMF may further query an SMF for a service identifier, service name, service type identifier, service type name, or the like corresponding to the session identifier and/or the flow identifier, so as to obtain a correspondence between matching values and the session identifiers and/or flow identifiers.

Step 203: At a subsequent occasion, an application server sends application data to the terminal.

Step 204: After the application data reaches a UPF, and the UPF sends a downlink data notification, such as a DL data notify message, to the SME The downlink data notification may carry an application identifier recognized by the UPF, or the downlink data notification carries at least one of a rule identifier, session identifier, and flow identifier recognized by the UPF after the UPF finds a matching rule by performing matching on received downlink data according to a packet detection rule. The matching rule includes at least one of a rule identifier, an original IP address, an original port, protocol information, codec information, and other content.

Step 205: Based on the application identifier or at least one of the rule identifier, the session identifier, and the flow identifier, the SMF finds corresponding service information, such as a service name and/or a service identifier.

Optionally, the service information may further include service initiator information. If the rule identifier or the application identifier or the flow identifier or the session identifier+the flow identifier is the service information, this step may not be executed.

Step 206: The SMF sends a paging request message, such as Namf_Communication_N1N2MessageTransfer message, to the AMF, where the paging request message carries the service information.

The AMF in this step may be different from the AMF in step 202 due to movement of the terminal, but related matching information can be obtained from the original AMF.

Step 207: The AMF obtains the matching value based on the service information, and then sends a paging message, such as a page message, to the terminal through the base station, where the paging message carries the matching value.

After receiving the paging message carrying the matching value, the terminal determines, based on the matching value, whether to respond to the paging message, to be specific, whether to initiate a service request to establish a connection with a mobile network.

For example, the terminal determines, based on a priority corresponding to the matching value, whether to respond; or determines, based on a matching value acceptable for an ongoing service, whether to respond; or determines, based on whether a matching value corresponding to service information of another service includes the matching value in the paging message, whether to respond, where the another service is a service acceptable for an ongoing service executed by the terminal device.

For another example, the terminal prompts the user with the service information corresponding to the matching value, thereby allowing the user to determine whether to accept the corresponding service.

Embodiment 2

Figure 3:
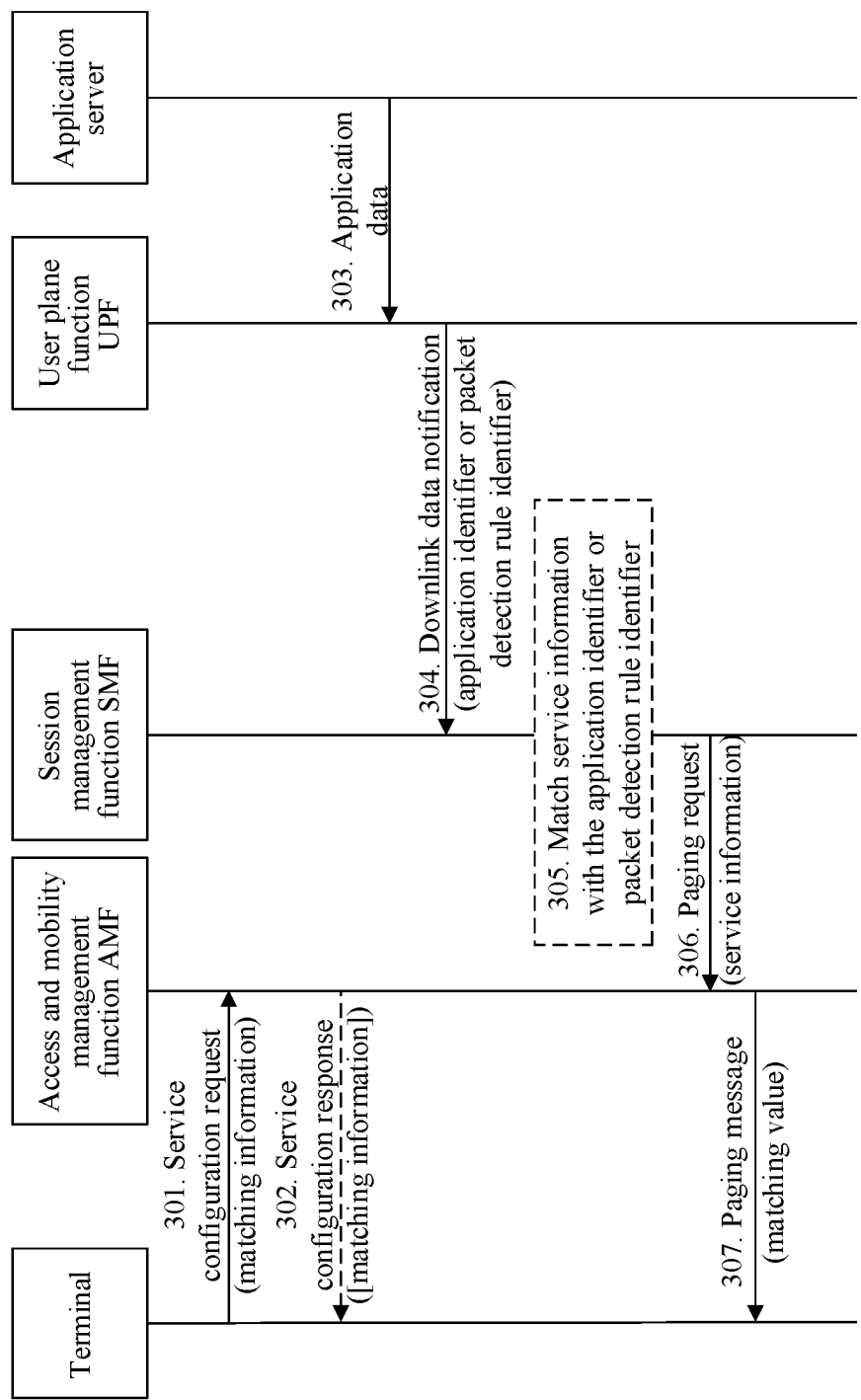

In this embodiment, a terminal may assign a matching value to each service. Certainly, a network may modify some matching values. As shown in FIG. 3, this embodiment may include the following steps: step 301 to step 307.

Step 301: A terminal sends a service configuration request message to an AMF by using a NAS message, for example, sends a UL NAS message or a registration request message, where the service configuration request message may carry one or more matching relationships, such as a policy matching relationship or a cause matching relationship.

If the matching relationship includes at least a matching value (which is, for example, a policy identifier in policy matching information, and a cause value in cause matching information) and one or more pieces of service information/service type information corresponding to the matching value.

The following uses the matching relationship including a matching value and one or more pieces of service information corresponding to the matching value as an example for illustration. It can be understood that when the matching relationship includes a matching value and one or more pieces of service type information corresponding to the matching value, the execution process is similar to the foregoing execution process, and therefore is not described herein again.

If the matching information is policy matching information, the matching information may further include: priority information corresponding to each piece of service information, or one or more pieces of high-priority service information corresponding to each piece of service information, or one or more pieces of low-priority service information corresponding to each piece of service information. The plurality of pieces of service information may correspond to the same one or more pieces of high-/low-priority service information.

The service information or high-/low-priority service information may include a service name such as WeChat, QQ, an instant messaging service voice call (IMS Voice call), an instant messaging service video call (IMS Video call), and a game name; or may include a name and/or an identifier of a service type, for example, service type identifier 1 corresponds to a service type name "instant messaging service" such as WeChat or QQ, service type identifier 2 corresponds to a service type name "IMS" such as a voice call or a video call, and service type identifier 3 corresponds to a service type name "gaming"; or may include a service identifier, for example, 1 corresponds to WeChat, 2 corresponds to IMS voice call, and 3 corresponds to QQ.

Optionally, the service information or high-/low-priority service information may further include session identifiers and/or flow identifiers corresponding to all services during session establishment of the terminal, or may include service initiator information such as a calling number of the IMS.

A service indicated by the high-priority service information is allowed to preempt a service indicated by the one or more pieces of service information corresponding to the high-priority service information; and a service indicated by the low-priority service information is not allowed to interfere with a service indicated by the one or more pieces of service information corresponding to the low-priority service information.

Optionally, the service configuration request message may carry validity period information, and the validity period information may indicate that related information is to be updated before expiration, for example, steps 301 and 302 are executed again, or step 301 is executed again to update the related information.

Optionally, the policy identifier or the cause value may be randomly generated, or generated by using other calculation methods, for example, by using a hash function, so that there is no regularity among a plurality of policy identifiers or a plurality of cause values. If one matching value corresponds to a plurality of pieces of service information, it can be expressed that the plurality of pieces of service information correspond to a same matching value. The plurality of pieces of service information may correspond to the same one or more pieces of high-/low-priority service information.

When the service information includes a session identifier and/or a flow identifier, in a subsequent process, the AMF may further query an SMF for a service identifier, service name, service type identifier, service type name, or the like corresponding to the session identifier and/or the flow identifier, so as to obtain a correspondence between matching values and services/service types.

Step 302 (this step is optional): The AMF sends a service configuration response message to the terminal by using a NAS message, for example, sends a DL NAS message or a registration accept message.

The service configuration response message may carry one or more matching relationships, or may carry validity period information. The matching relationship includes at least a matching value. The matching value may include only some of matching values received from the terminal. For example, when the network device does not support identifying a service indicated by some service information in step 201, no corresponding matching value is returned.

The matching relationship may further include the matching value in step 201 and a corresponding re-assigned matching value, which means that a new matching value is re-assigned to the corresponding matching value.

The matching relationship may further include one or more pieces of service information corresponding to the matching value, and the service information in the matching information may be a subset or a universal set of all the service information in step 201.

If the matching relationship is a policy matching relationship, the matching relationship may further include: priority information corresponding to each piece of service information, or one or more pieces of high-priority service information corresponding to each piece of service information, or one or more pieces of low-priority service information corresponding to each piece of service information. The plurality of pieces of service information may correspond to the same one or more pieces of high-/low-priority service information.

The policy identifier or the cause value may be randomly generated, or generated by using other calculation methods, for example, by using a hash function, or may be from the terminal, so that there is no regularity among a plurality of policy identifiers or a plurality of cause values. If one matching value corresponds to a plurality of pieces of service information, it can be expressed that the plurality of pieces of service information correspond to a same matching value, or that the plurality of pieces of service information correspond to one or more pieces of high-/low-priority service information.

Step 303: At a subsequent occasion, an application server sends application data to the terminal.

Step 304: After the application data reaches a UPF, and the UPF sends a downlink data notification, such as a DL data notify message, to the SME The downlink data notification may carry an application identifier recognized by the UPF, or the downlink data notification carries at least one of a rule identifier, session identifier, and flow identifier recognized by the UPF after the UPF finds a matching rule by performing matching on received downlink data according to a packet detection rule. The matching rule includes at least one of a rule identifier, an original IP address, an original port, protocol information, codec information, and other content.

Step 305: Based on the application identifier or at least one of the rule identifier, the session identifier, and the flow identifier, the SMF finds corresponding service information, such as a service name and/or a service identifier.

Optionally, the service information may further include service initiator information. If the rule identifier or the application identifier or the flow identifier or the session identifier+the flow identifier is the service information, this step may not be executed.

Step 306: The SMF sends a paging request message, such as Namf_Communication_N1N2MessageTransfer message, to the AMF, where the paging request message carries the service information.

The AMF in this step may be different from the AMF in step 301 due to movement of the terminal, but related matching information can be obtained from the original AMF.

Step 307: The AMF obtains the matching value based on the service information, and then sends a paging message, such as a page message, to the terminal through the base station, where the paging message carries the matching value.

After receiving the paging message carrying the matching value, the terminal determines, based on the matching value, whether to respond to the paging message, to be specific, whether to initiate a service request to establish a connection with a mobile network.

For example, the terminal determines, based on a priority corresponding to the matching value, whether to respond; or determines, based on a matching value acceptable for an ongoing service, whether to respond; or determines, based on whether a matching value corresponding to service information of another service includes the matching value in the paging message, whether to respond, where the another service is a service acceptable for an ongoing service executed by the terminal device.

For another example, the terminal prompts the user with the service information corresponding to the matching value, thereby allowing the user to determine whether to accept the corresponding service.

Embodiment 3

Figure 4:
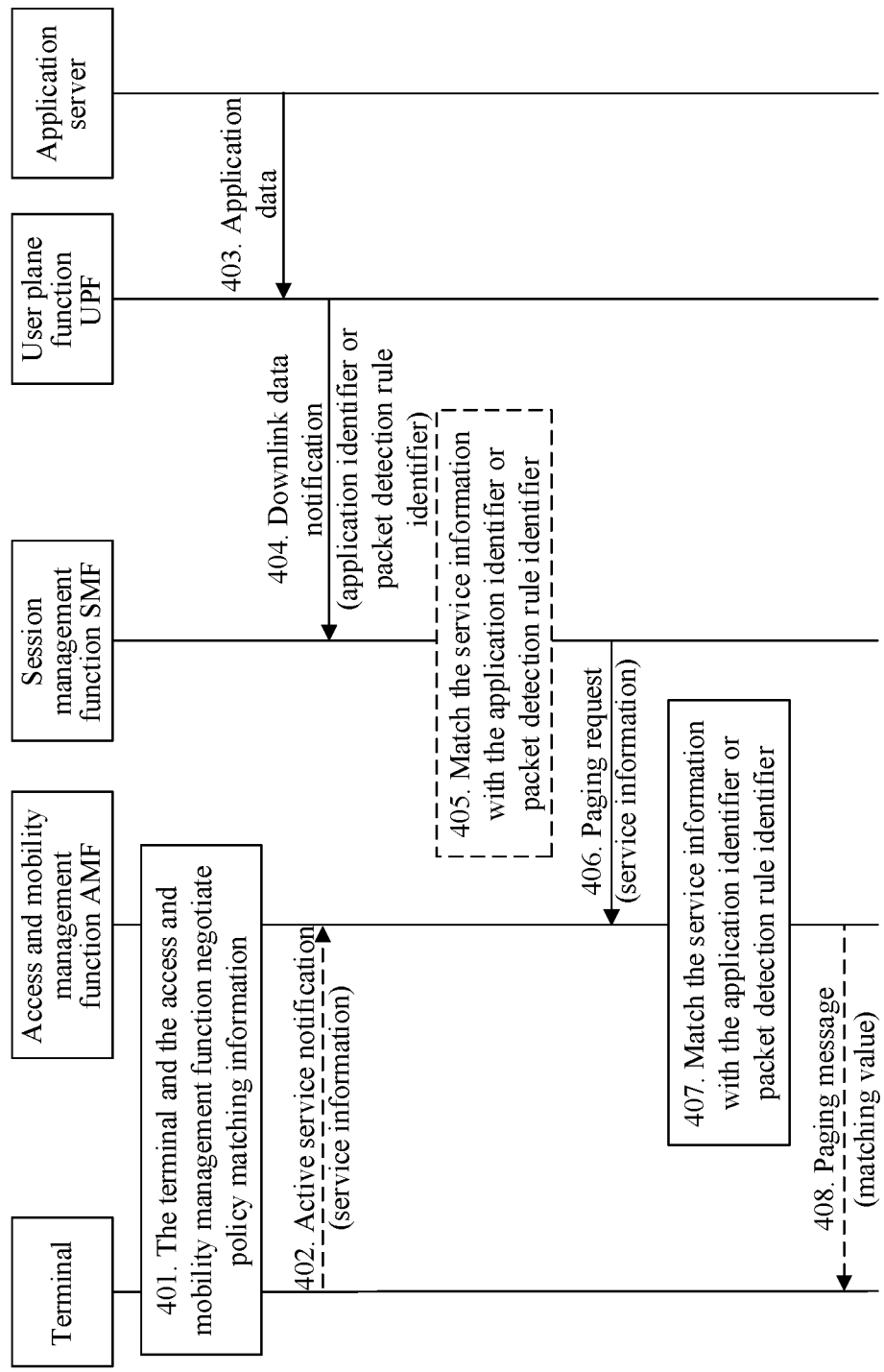

This embodiment is mainly to embody the role of policy matching information. As shown in FIG. 4, this embodiment may include the following steps: step 401 to step 408.

Step 401: Perform steps 201 and 202 in Embodiment 1 or steps 301 and 302 in Embodiment 2 to complete the procedure of negotiating policy matching information between a terminal and an AMF.

Step 402: Optionally, the terminal notifies the AMF of service information of a currently active service of another USIM, for example, sends a UL NAS message, which carries the service information. In this embodiment, the terminal may have multiple USIMs installed.

Step 403: At a subsequent occasion, an application server sends application data to the terminal.

Step 404: After the application data reaches a UPF, and the UPF sends a downlink data notification, such as a DL data notify message, to the SME The downlink data notification may carry an application identifier recognized by the UPF, or the downlink data notification carries at least one of a rule identifier, session identifier, and flow identifier recognized by the UPF after the UPF finds a matching rule by performing matching on received downlink data according to a packet detection rule. The matching rule includes an original IP address, an original port, protocol information, and other content.

Step 405: Based on the application identifier or at least one of the rule identifier, the session identifier, and the flow identifier, the SMF finds corresponding service information, such as a service name and/or a service identifier.

Optionally, the service information may further include service initiator information. If the rule identifier or the application identifier or the flow identifier or the session identifier+the flow identifier is the service information, this step may not be executed.

Step 406: The SMF sends a paging request message, such as Namf_Communication_N1N2MessageTransfer message, to the AMF, where the paging request message carries the service information.

The AMF in this step may be different from the AMF in step 401 due to movement of the terminal, but related matching information can be obtained from the original AMF.

Step 407: Based on the service information from the SMF and the policy matching information negotiated with the terminal, the AMF determines whether to perform paging.

For example, the AMF finds a priority of the service information from the SMF (referred to as first service information for ease of distinguishing) in the policy matching information, finds a priority of the service information of the currently active service of the terminal (referred to as second service information for ease of distinguishing) in the policy matching information, and compares the two priorities. If the priority of the first service information is lower, that is, lower than the priority of the second service information, the AMF refuses to perform paging, and optionally notifies the SMF; if the priority of the first service information is higher, the AMF performs paging; and if the priorities of the first service information and the second service information are equal, the AMF may perform paging, or certainly, may refuse to perform paging.

For another example, the AMF finds low-priority service information corresponding to the second service information in the policy matching information, and if the first service information is in the low-priority service information, the AMF refuses to perform paging; if the first service information is not in the low-priority service information, the AMF performs paging.

For further another example, the AMF finds high-priority service information corresponding to the second service information in the policy matching information, and if the first service information is in the high-priority service information, the AMF performs paging; if the first service information is not in the high-priority service information, the AMF refuses to perform paging.

Step 408: When performing paging, the AMF obtains the matching value based on the first service information, and then sends a paging message, such as a page message, to the terminal through the base station, where the paging message carries the matching value.

After receiving the paging message carrying the matching value, the terminal determines, based on the matching value, whether to respond to the paging message, to be specific, whether to initiate a service request to establish a connection with a mobile network.

For example, the terminal determines, based on a priority corresponding to the matching value, whether to respond; or determines, based on a matching value acceptable for the second service information, whether to respond; or determines, based on whether a matching value corresponding to service information of another service includes the matching value in the paging message, whether to respond, where the another service is a service acceptable for an ongoing service executed by the terminal device.

For another example, the terminal prompts the user with the service information corresponding to the matching value, thereby allowing the user to determine whether to accept the corresponding service.

It should be noted that in step 407, the AMF has determined, based on the policy matching information, whether to perform paging, and after being paged, the terminal determines, based on the policy matching information again, whether to respond to the paging. In this implementation, it is mainly considered that the terminal may have generated new policy matching information but has not notified the network in a timely manner, thereby improving initiative of the terminal for determining whether to respond to paging, and helping improve user experience.

Embodiment 4

Figure 5:
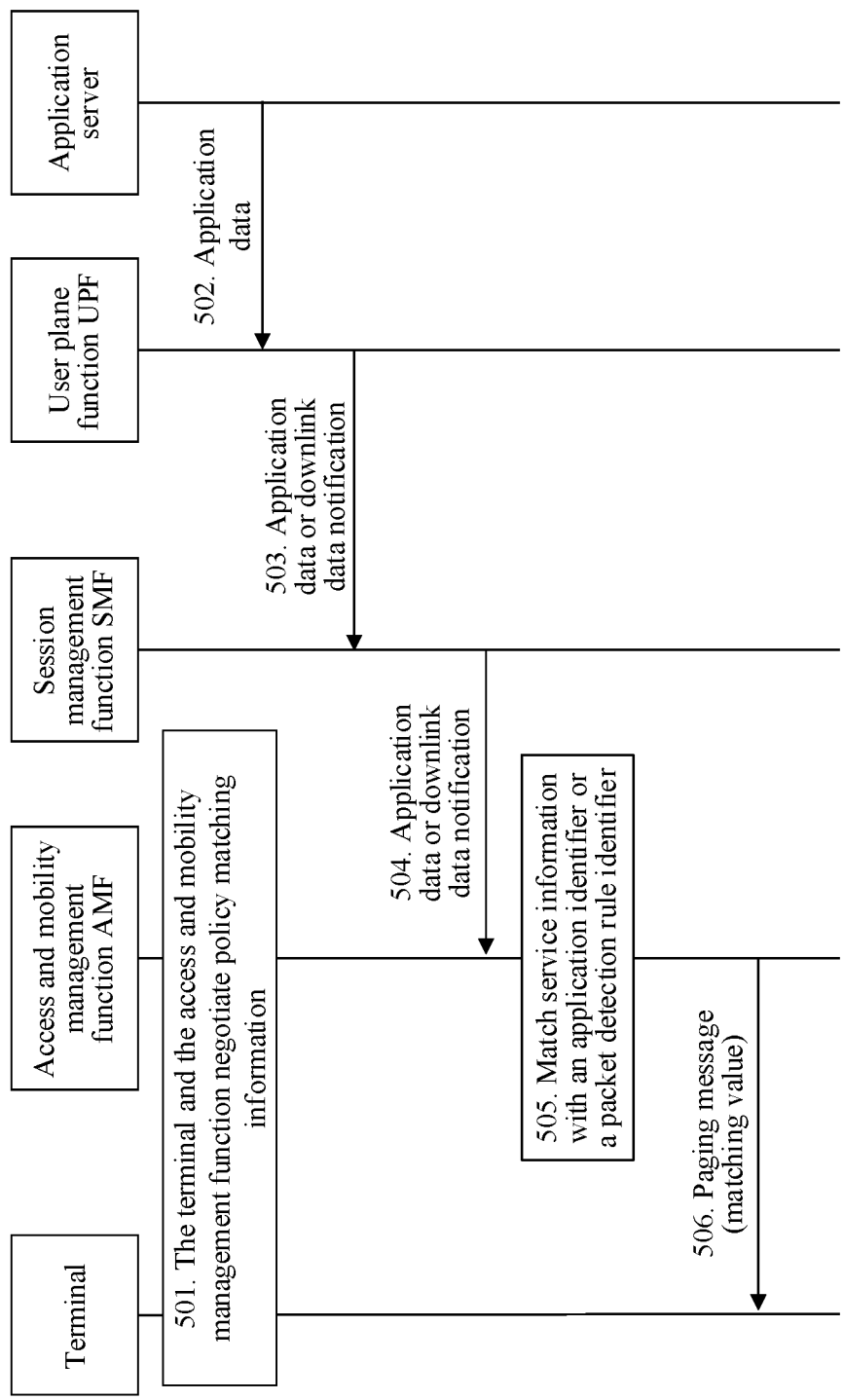

In this embodiment, service information and a matching value may be determined by different network functions. As shown in FIG. 5, this embodiment may include the following steps: step 501 to step 506.

Step 501: Perform steps 201 and 202 in Embodiment 1 or steps 301 and 302 in Embodiment 2 to complete the procedure of negotiating policy matching information between a terminal and an AMF.

Step 502: At a subsequent occasion, an application server sends application data to the terminal.

Step 503: The application data reaches a UPF, and the UPF forwards the application data to an SMF; or the UPF sends a downlink data arrival notification to an SMF, where the downlink data arrival notification carries an application identifier recognized by the UPF; or after finding a matching rule by performing matching on received application data according to a packet detection rule, the UPF sends at least one of a rule identifier, a session identifier, and a flow identifier, where the matching rule includes an original IP address, an original port, protocol information, and other content.

Step 504: The SMF forwards the application data or a downlink data notification to the AMF.

Optionally, the SMF may query the AMF for the matching information, and after obtaining the matching information, may obtain the matching value in the manner of determining the matching value by the AMF described in step 505, and add the matching value to the downlink data notification. In this way, the operation of obtaining the matching value may be executed by the SMF, so that the AMF can directly receive the matching value.

Step 505: Optionally, the AMF may query the SMF for a packet detection rule and/or an application identification rule, so that after receiving the application data, the AMF can use the application identification rule to identify the application identifier. Alternatively, after finding a matching rule by performing matching on received downlink data according to a packet detection rule, the AMF obtains at least one of a rule identifier, a session identifier, and a flow identifier, where the matching rule includes an original IP address, an original port, protocol information, and the like. The AMF finds corresponding service information, such as a service name and/or a service identifier, based on at least one of the application identifier, the rule identifier, the session identifier, and the flow identifier. The service information may further include service initiator information. If the rule identifier or the application identifier or the flow identifier or the session identifier+the flow identifier is the service information, this step is not executed.

Optionally, when receiving the downlink data notification, the AMF may find corresponding service information, such as a service name and/or a service identifier, based on at least one of the application identifier, the rule identifier, the session identifier, and the flow identifier, where the service information may further include service initiator information. If the rule identifier or the application identifier or the flow identifier or the session identifier+the flow identifier is the service information, this step may not be executed.

The AMF may obtain the matching value based on the determined service information and matching information; or may obtain the matching value from the downlink data notification.

The AMF in this case may be different from the AMF in step 501 due to movement of the terminal, but matching information can be obtained from the original AMF.

Step 506: The AMF sends a paging message, such as a page message, to the terminal through the base station, where the paging message carries the matching value.

After receiving the paging message carrying the matching value, the terminal determines, based on the matching value, whether to respond to the paging message, to be specific, whether to initiate a service request to establish a connection with a mobile network.

For example, the terminal determines, based on a priority corresponding to the matching value, whether to respond; or determines, based on a matching value acceptable for an ongoing service, whether to respond; or determines, based on whether a matching value corresponding to service information of another service includes the matching value in the paging message, whether to respond, where the another service is a service acceptable for an ongoing service executed by the terminal device.

For another example, the terminal prompts the user with the service information corresponding to the matching value, thereby allowing the user to determine whether to accept the corresponding service.

Embodiment 5

Figure 6:
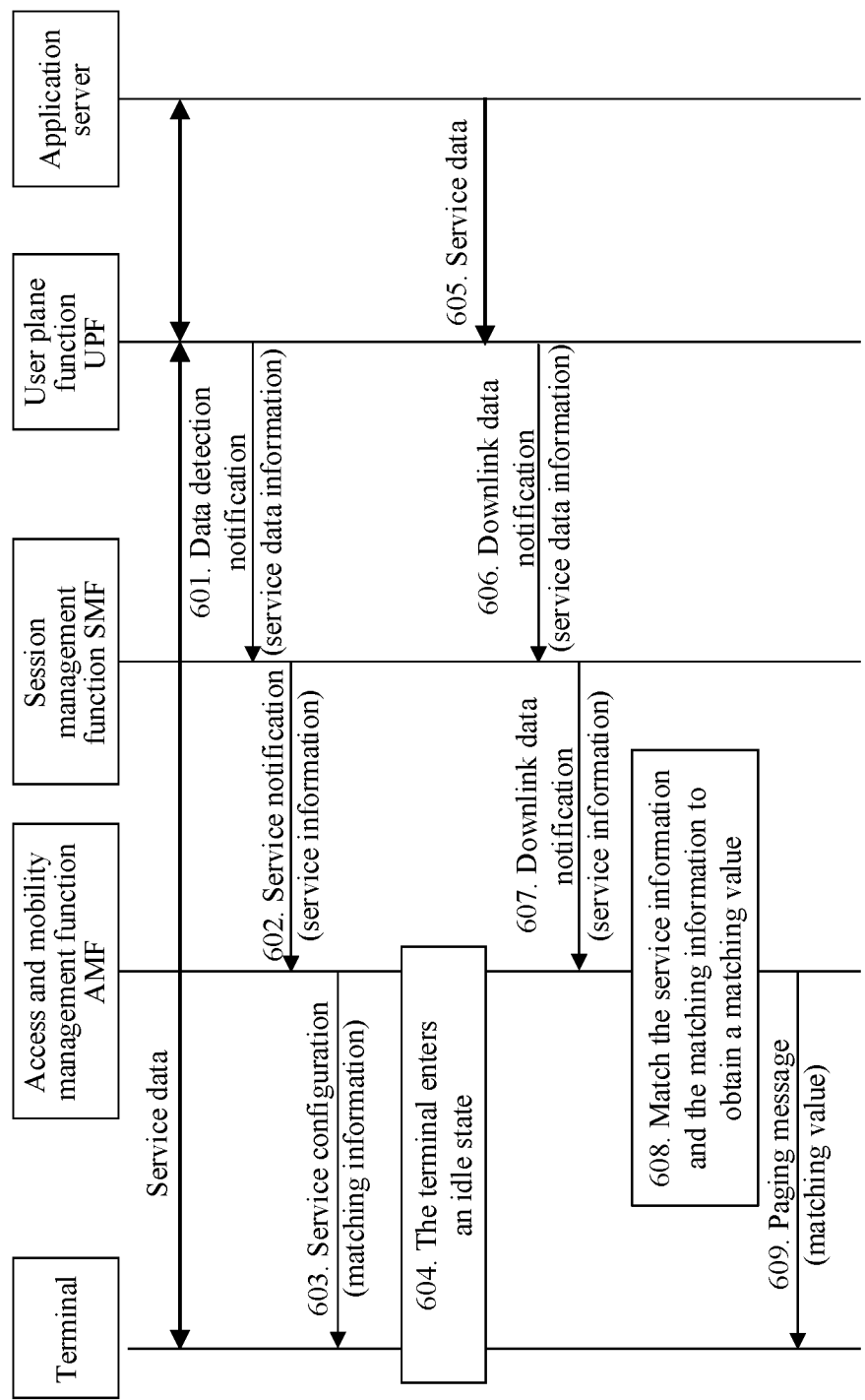

As shown in FIG. 6, this embodiment may include the following steps: step 601 to step 609.

Step 601: A terminal enters a connected state, and interacts with an application server to receive or send service data. For a service that has not been configured with matching information for an end user, an SMF delivers a data detection rule to a UPF, including a rule identifier and a set of service data information for matching. The service data information includes packet content such as a set of IP addresses, a set of port numbers, and a set of protocol information. After detecting the service data, the UPF sends a data detection notification to the SMF, where the data detection notification carries the rule identifier or the service data information.

Step 602: The SMF finds corresponding service information based on the rule identifier or the service data information, and sends a service notification to the AMF, where the service notification carries the service information.

Step 603: The AMF sends a service configuration message to the terminal, where the service configuration message carries matching information including a generated matching value and corresponding service information, and the service information includes a service name or a service identifier, or may further include service data information.

Step 604: The terminal matches an ongoing service based on the service information, and stores matching information or a matching value of the corresponding service, and the terminal enters an idle state at an occasion later.

Steps 601 to 604 may be repeated for different services, so that the terminal and the network can complete configuration for various services.

Step 605: At some occasions, the UPF receives the service data.

Step 606: Because the terminal is in the idle state, the UPF sends a downlink data notification to the SMF, where the downlink data notification carries the rule identifier or the service data information.

Step 607: The SMF finds corresponding service information based on the rule identifier or the service data information, and then sends the downlink data notification to the AMF, where the downlink data notification carries the service information.

Step 608: Based on the service information, the AMF finds the corresponding matching value from the matching information specific to the user.

Step 609: The AMF sends a paging message to the terminal through a base station, where the paging message carries the matching value.

It should be noted that the foregoing embodiments of this specification may also be applied more widely to an LTE system, the matching information interaction procedure between the terminal and the AMF may be mapped to a matching information interaction procedure between the terminal and a mobility management entity (MME), the procedure of adding service information by the SMF to the AMF may be mapped to an interaction procedure between a serving gateway (SGW)/a PDN Gateway (Packet Data Network Gateway, PGW) and an MME; and the procedure of sending a page message with a matching value by the AMF to the terminal may be mapped to a procedure of sending a page message with a matching value by the MME to the terminal.

The foregoing describes in detail the service indication method according to the embodiments of this application with reference to FIG. 1 to FIG. 6. The following describes a service indication method according to another embodiment of this disclosure in detail with reference to FIG. 7. It can be understood that interaction between a network and terminal device described from the network side is the same as that described from the network side in the method shown in FIG. 1, and therefore related description is appropriately omitted to avoid repetition.

FIG. 7 is a schematic diagram of an implementation process of a service indication method according to an embodiment of this disclosure, where the method may be applied to a terminal device side. As shown in FIG. 7, the method 700 may include the following steps.

S702: Send, to a network, matching information specific to a user of a terminal device, or receive, from the network, the matching information specific to the user of the terminal device, where the matching information may include one or more matching values, and one of the matching values may correspond to one or more services or corresponds to one or more service types.

In this embodiment of this disclosure, the terminal device may send matching information specific to a user of the terminal device, or receive the matching information from the network, where the matching information includes one or more matching values, and one of the matching values corresponds to one or more services or service types. This resolves the problem that the matching value related to the service cannot be set in the related art, and improves communication effectiveness.

Optionally, in an embodiment, after S702, the method may further include:
 receiving, from the network, a message carrying a first target matching value; and
 sending prompt information of a target service or a target service type based on the first target matching value; where
 the first target matching value may correspond to the target service or the target service type, and the target service or the target service type may be determined based on the first target matching value and the matching information.

Optionally, in an embodiment, after S702, the method may further include:
 sending, to the network, service information or service type information corresponding to a currently active service, where
 the service information or service type information corresponding to the currently active service is used by the network to determine, based on the matching information and the service information or service type information corresponding to the currently active service, whether to send a paging message.

Optionally, in an embodiment, after S702, the method may further include:

determining, based on the first target matching value and the service information or service type information corresponding to the currently active service, whether to respond to the message.

Optionally, in an embodiment, before S702, the method may further include:

receiving a request message sent by the network, where the request message includes one or more pieces of service information or one or more pieces of service type information, the service information is used to indicate the service, and the service type information is used to indicate the service type; and generating a corresponding matching value for the service information or the service type information.

Optionally, in an embodiment, before S702, the method may further include:

sending a request message to the network, where the request message includes one or more pieces of service information or one or more pieces of service type information, the service information is used to indicate the service, and the service type information is used to indicate the service type.

Optionally, in an embodiment, the request message may further include at least one piece of the following information corresponding to target service information or target service type information:

one or more pieces of high-priority service information, where a service corresponding to the high-priority service information is capable of preempting a service corresponding to the target service information;

one or more pieces of high-priority service type information, where a service corresponding to the high-priority service type information is capable of preempting a service corresponding to the target service type information;

one or more pieces of low-priority service information, where a service corresponding to the low-priority service information is incapable of preempting a service corresponding to the target service information;

one or more pieces of low-priority service type information, where a service corresponding to the low-priority service type information is incapable of preempting a service corresponding to the target service type information;

priority information of a service corresponding to the target service information;

priority information of a service type corresponding to the target service type information;

initiator information of a service corresponding to the target service information; and initiator information of a service of a service type corresponding to the target service type information.

Optionally, in an embodiment, the matching value may be:

randomly generated; or calculated by using a hash function.

Optionally, in an embodiment, the matching information may further include at least one piece of the following information corresponding to a second target matching value:

one or more pieces of target service information;

one or more pieces of target service type information;

one or more pieces of high-priority service information, where a service corresponding to the high-priority service information is capable of preempting a service corresponding to the target service information;

one or more pieces of high-priority service type information, where a service corresponding to the high-priority service type information is capable of preempting a service corresponding to the target service type information;

one or more pieces of low-priority service information, where a service corresponding to the low-priority service information is incapable of preempting a service corresponding to the target service information;

one or more pieces of low-priority service type information, where a service corresponding to the low-priority service type information is incapable of preempting a service corresponding to the target service type information;

priority information of a service corresponding to the target service information;

priority information of a service type corresponding to the target service type information;

initiator information of a service corresponding to the target service information; and initiator information of a service of a service type corresponding to the target service type information; where the second target matching value may be one of the one or more matching values.

Optionally, in an embodiment, the service may be represented by service information, the service type may be represented by service type information, and the service information and/or the service type information may include at least one of:

a name;

an identifier; and rule information.

Optionally, in an embodiment, the rule information may further include at least one of the following:

a rule identifier;

one or more IP addresses;

one or more port numbers;

one or more protocol types; and one or more pieces of codec information; where the IP address includes a number or a wildcard, and the port number includes a number or a wildcard.

The foregoing describes in detail the service indication method according to the embodiments of this application with reference to FIG. 1 to FIG. 7. The following describes in detail a terminal device according to an embodiment of this disclosure with reference to FIG. 8.

FIG. 8 is a schematic structural diagram of a terminal device according to an embodiment of this disclosure. As shown in FIG. 8, the terminal device 800 includes:

a communications module 802, which may be configured to send, to a network, matching information specific to a user of the terminal device, or receive, from the network, the matching information specific to the user of the terminal device, where the matching information includes one or more matching values, and one of the matching values corresponds to one or more services or corresponds to one or more service types.

In this embodiment of this disclosure, the terminal device may send matching information specific to a user of the terminal device, or receive the matching information from the network, where the matching information includes one or more matching values, and one of the matching values corresponds to one or more services or service types. This resolves the problem that the matching value related to the service cannot be set in the related art, and improves communication effectiveness.

Optionally, in an embodiment, the communications module 802 may be further configured to:
receive, from the network, a message carrying a first target matching value; and
send prompt information of a target service or a target service type based on the first target matching value; where
the first target matching value may correspond to the target service or the target service type, and the target service or the target service type may be determined based on the first target matching value and the matching information.

Optionally, in an embodiment, the communications module 802 may be further configured to:
send, to the network, service information or service type information corresponding to a currently active service, where
the service information or service type information corresponding to the currently active service may be used by the network to determine, based on the matching information and the service information or service type information corresponding to the currently active service, whether to send a paging message.

Optionally, in an embodiment, the communications module 802 may be further configured to:
determine, based on the first target matching value and the service information or service type information corresponding to the currently active service, whether to respond to the message.

Optionally, in an embodiment, the communications module 802 may be further configured to:
receive a request message sent by the network, where the request message may include one or more pieces of service information or one or more pieces of service type information, the service information may be used to indicate the service, and the service type information may be used to indicate the service type; and
generate a corresponding matching value for the service information or the service type information.

Optionally, in an embodiment, the communications module 802 may be further configured to:
send a request message to the network, where the request message may include one or more pieces of service information or one or more pieces of service type information, the service information is used to indicate the service, and the service type information is used to indicate the service type.

Optionally, in an embodiment, the request message may further include at least one piece of the following information corresponding to target service information or target service type information:
one or more pieces of high-priority service information, where a service corresponding to the high-priority service information is capable of preempting a service corresponding to the target service information;
one or more pieces of high-priority service type information, where a service corresponding to the high-priority service type information is capable of preempting a service corresponding to the target service type information;
one or more pieces of low-priority service information, where a service corresponding to the low-priority service information is incapable of preempting a service corresponding to the target service information;
one or more pieces of low-priority service type information, where a service corresponding to the low-priority service type information is incapable of preempting a service corresponding to the target service type information;
priority information of a service corresponding to the target service information;
priority information of a service type corresponding to the target service type information;
initiator information of a service corresponding to the target service information; and
initiator information of a service of a service type corresponding to the target service type information.

Optionally, in an embodiment, the matching value may be:
randomly generated; or
calculated by using a hash function.

Optionally, in an embodiment, the matching information may further include at least one piece of the following information corresponding to a second target matching value:
one or more pieces of target service information;
one or more pieces of target service type information;
one or more pieces of high-priority service information, where a service corresponding to the high-priority service information is capable of preempting a service corresponding to the target service information;
one or more pieces of high-priority service type information, where a service corresponding to the high-priority service type information is capable of preempting a service corresponding to the target service type information;
one or more pieces of low-priority service information, where a service corresponding to the low-priority service information is incapable of preempting a service corresponding to the target service information;
one or more pieces of low-priority service type information, where a service corresponding to the low-priority service type information is incapable of preempting a service corresponding to the target service type information;
priority information of a service corresponding to the target service information;
priority information of a service type corresponding to the target service type information;
initiator information of a service corresponding to the target service information; and
initiator information of a service of a service type corresponding to the target service type information; where
the second target matching value may be one of the one or more matching values.

Optionally, in an embodiment, the service may be represented by service information, the service type may be represented by service type information, and the service information and/or the service type information may include at least one of:
a name;
an identifier; and
rule information.

Optionally, in an embodiment, the rule information includes at least one of the following:
a rule identifier;
one or more IP addresses;

one or more port numbers;
one or more protocol types; and
one or more pieces of codec information; where
the IP address includes a number or a wildcard, and the port number includes a number or a wildcard.

For the terminal device 800 in this embodiment of this disclosure, refer to the processes of the method 700 in the corresponding embodiment of this disclosure. The units/modules of the terminal device 800 and other operations and/or functions described above are used to implement the corresponding processes of the method 700, with the same or equivalent technical effects achieved. For brevity, details are not repeated herein.

FIG. 9 is a schematic structural diagram of a network device according to an embodiment of this disclosure. As shown in FIG. 9, the network device 900 includes:

a communications module 902, configured to receive matching information specific to a user, or send the matching information specific to the user to a terminal device of the user, where
the matching information may include one or more matching values, and one of the matching values corresponds to one or more services or corresponds to one or more service types.

In this embodiment of this disclosure, the network function may receive matching information specific to a user, or may send the matching information to the terminal device, where the matching information includes one or more matching values, and one of the matching values corresponds to one or more services or service types. This resolves the problem that the matching value related to the service cannot be set in the related art, and improves communication effectiveness.

Optionally, in an embodiment, the communications module 902 may be further configured to:
receive a message related to data of a target service or a target service type, or receive the data of the target service or the target service type; and
send a first target matching value to the terminal device; where
the first target matching value may correspond to the target service or the target service type, and the message may be triggered by the data of the target service or the target service type.

Optionally, in an embodiment, the matching information may further include at least one piece of the following information corresponding to a second target matching value:
one or more pieces of target service information;
one or more pieces of target service type information;
one or more pieces of high-priority service information, where a service corresponding to the high-priority service information is capable of preempting a service corresponding to the target service information;
one or more pieces of high-priority service type information, where a service corresponding to the high-priority service type information is capable of preempting a service corresponding to the target service type information;
one or more pieces of low-priority service information, where a service corresponding to the low-priority service information is incapable of preempting a service corresponding to the target service information;
one or more pieces of low-priority service type information, where a service corresponding to the low-priority service type information is incapable of preempting a service corresponding to the target service type information;
priority information of a service corresponding to the target service information;
priority information of a service type corresponding to the target service type information;
initiator information of a service corresponding to the target service information; and
initiator information of a service of a service type corresponding to the target service type information; where
the second target matching value may be one of the one or more matching values.

Optionally, in an embodiment, the service may be represented by service information, the service type may be represented by service type information, and the service information and/or the service type information may include at least one of:
a name;
an identifier; and
rule information.

Optionally, in an embodiment, the rule information may further include at least one of the following:
a rule identifier;
one or more IP addresses;
one or more port numbers;
one or more protocol types; and
one or more pieces of codec information; where the IP address may include a number or a wildcard, and the port number may include a number or a wildcard.

Optionally, in an embodiment, the matching value may be:
randomly generated; or
calculated by using a hash function.

Optionally, in an embodiment, the communications module 902 may be further configured to:
send a request message to the terminal device of the user, where the request message includes one or more pieces of service information or one or more pieces of service type information, the service information is used to indicate the service, and the service type information is used to indicate the service type.

Optionally, in an embodiment, the communications module 902 may be further configured to:
receive a request message from the terminal device, where the request message includes one or more pieces of service information or one or more pieces of service type information, the service information is used to indicate the service, and the service type information is used to indicate the service type; and
generate a corresponding matching value for the service information or the service type information.

Optionally, in an embodiment, the request message may further include at least one piece of the following information corresponding to target service information or target service type information:
one or more pieces of high-priority service information, where a service corresponding to the high-priority service information is capable of preempting a service corresponding to the target service information;
one or more pieces of high-priority service type information, where a service corresponding to the high-priority service type information is capable of preempting a service corresponding to the target service type information;
one or more pieces of low-priority service information, where a service corresponding to the low-priority service information is incapable of preempting a service corresponding to the target service information;

one or more pieces of low-priority service type information, where a service corresponding to the low-priority service type information is incapable of preempting a service corresponding to the target service type information;

priority information of a service corresponding to the target service information;

priority information of a service type corresponding to the target service type information;

initiator information of a service corresponding to the target service information; and initiator information of a service of a service type corresponding to the target service type information.

Optionally, in an embodiment, the communications module 902 may be further configured to:

receive service information corresponding to a currently active service of the terminal device; and determine, based on the service information corresponding to the currently active service, the matching information, and one of the target service or the target service type, to refuse to send the first target matching value.

For the network device 900 in this embodiment of this disclosure, refer to the processes of the method 100 in the corresponding embodiment of this disclosure. The units/modules of the network device 900 and other operations and/or functions described above are used to implement the corresponding processes in the method 100, with the same or equivalent technical effects achieved. For brevity, details are not repeated herein.

Figure 10:
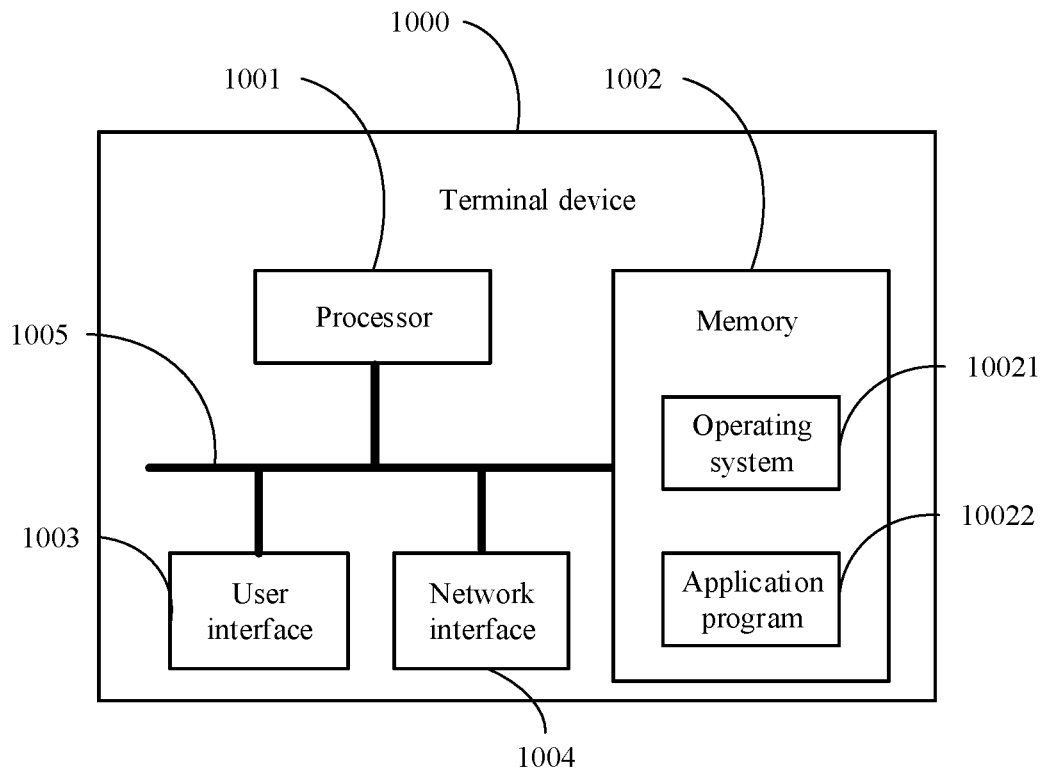
FIG. 10 is a schematic structural diagram of a terminal device according to another embodiment of this disclosure.

FIG. 10 is a block diagram of a terminal device according to another embodiment of this disclosure. The terminal device 1000 shown in FIG. 10 includes at least one processor 1001, a memory 1002, at least one network interface 1004, and a user interface 1003. The components in the terminal device 1000 are coupled together through a bus system 1005. It can be understood that the bus system 1005 is configured to implement connection and communication between these components. In addition to a data bus, the bus system 1005 further includes a power bus, a control bus, and a status signal bus. However, for clarity of description, various buses are marked as the bus system 1005 in FIG. 10.

The user interface 1003 may include a display, a keyboard, a pointing device (for example, a mouse or a trackball), a touch panel or a touchscreen, and the like.

It can be understood that the memory 1002 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 1002 of the system and method described in the embodiments of this disclosure is intended to include but not be limited to these and any other applicable types of memories.

In some implementations, the memory 1002 stores the following elements: executable modules or data structures, or a subset thereof, or an extended set thereof: an operating system 10021 and an application program 10022.

The operating system 10021 includes various system programs, such as a framework layer, a core library layer, and a driver layer, and is used to implement various basic services and processing hardware-based tasks. The application program 10022 includes various application programs, such as a media player and a browser, which are used to implement various application services. A program for implementing the method in the embodiments of this disclosure may be included in the application program 10022.

In this embodiment of this disclosure, the terminal device 1000 further includes a computer program stored in the memory 1002 and capable of running on the processor 1001, where when the computer program is executed by the processor 1001, the steps of the method 700 are implemented.

The methods disclosed in the foregoing embodiments of this disclosure may be applied to the processor 1001, or may be implemented by the processor 1001. The processor 1001 may be an integrated circuit chip, having a signal processing capability. In an implementation process, the steps of the foregoing method may be implemented by an integrated logic circuit of hardware in the processor 1001, or by a software instruction. The processor 1001 may be a general-purpose processor, a digital signal processor (DSP), an application specific integrated circuit (ASIC), a field programmable gate array (FPGA) or another programmable logic device, a discrete gate or transistor logic device, or a discrete hardware component. The processor can implement or execute the methods, steps, and logical block diagrams disclosed in the embodiments of this disclosure. The general-purpose processor may be a microprocessor, or the processor may be any conventional processor or the like. Steps of the methods disclosed with reference to the embodiments of this disclosure may be directly performed and completed by using a hardware decoding processor, or may be performed and completed by using a combination of hardware and a software module in a decoding processor. The software module may be located in a computer readable storage medium that is mature in the art, such as a random access memory, a flash memory, a read-only memory, a programmable read-only memory or electrically erasable programmable memory, or a register. The computer-readable storage medium is located in the memory 1002, and the processor 1001 reads information in the memory 1002, and completes the steps of the foregoing method in combination with its hardware. Specifically, the computer-readable storage medium stores a computer program, and when the computer program is executed by the processor 1001, the steps in the foregoing method 700 are implemented.

It can be understood that the embodiments described in the embodiments of this disclosure may be implemented by hardware, software, firmware, middleware, microcode, or a combination thereof. For hardware implementation, the processing unit may be implemented in one or more application-specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit for performing the functions described in this application, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in the processor or external to the processor.

The terminal device 1000 is capable of implementing the processes that are implemented by the terminal device in the foregoing embodiments, with the same or equivalent technical effects achieved. To avoid repetition, details are not described herein again.

Figure 11:
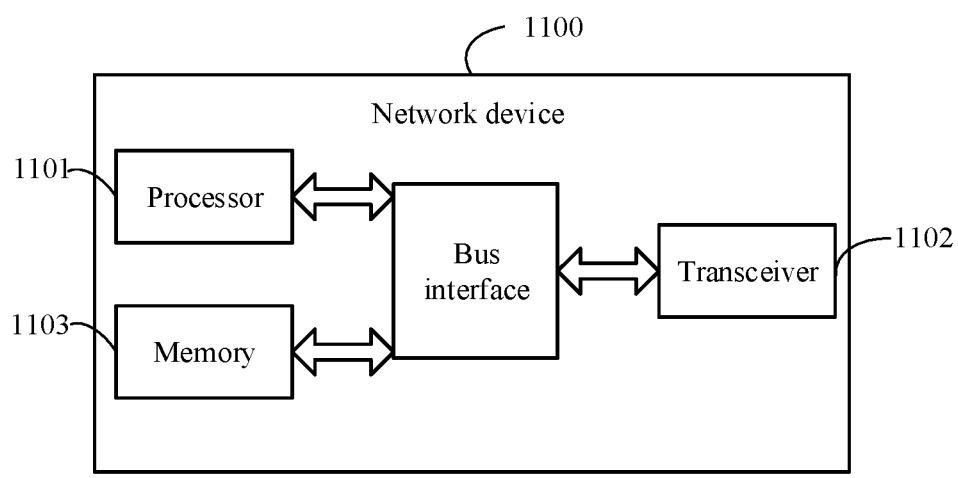
FIG. 11 is a schematic structural diagram of a network device according to another embodiment of this disclosure.

Referring to FIG. 11, FIG. 11 is a structural diagram of a network device to which an embodiment of this disclosure is applied. The network device can implement details of the method embodiment 100, with the same effect achieved. As shown in FIG. 11, the network device 1100 includes a processor 1101, a transceiver 1102, a memory 1103, and a bus interface.

In this embodiment of this disclosure, the network device 1100 further includes a computer program stored in the memory 1103 and capable of running on the processor 1101, where when the computer program is executed by the processor 1101, the steps of the method 100 are implemented.

In FIG. 11, a bus architecture may include any quantity of interconnected buses and bridges, and specifically connect together various circuits of one or more processors represented by the processor 1101 and a memory represented by the memory 1103. The bus architecture may further interconnect various other circuits such as a peripheral device, a voltage regulator, and a power management circuit. These are all common sense in the art, and therefore are not further described in this specification. The bus interface provides interfaces. The transceiver 1102 may be a plurality of components, including a transmitter and a receiver, and provides units for communicating with a variety of other apparatuses on a transmission medium.

The processor 1101 is responsible for bus architecture management and general processing. The memory 1103 may store data used when the processor 1101 performs an operation.

The processor 1101 may include, but is not limited to, a general-purpose processor, a dedicated processor, a special application processor, or a field programmable logic processor.

The memory 1103 may include a read-only memory (ROM), a random access memory (RAM), a magnetic disk storage medium device, an optical storage medium device, a flash memory device, an electrical, optical, or other physical/tangible memory storage device.

An embodiment of this disclosure further provides a computer-readable storage medium, where the computer-readable storage medium stores a computer program, and when the computer program is executed by a processor, the processes of the method embodiment 100 to the method embodiment 700 are implemented, with the same technical effect achieved. To avoid repetition, details are not described herein again. For example, the computer-readable storage medium includes a non-transitory computer-readable storage medium, such as a ROM, a RAM, a magnetic disc, or an optical disc.

The various aspects of this disclosure have been described above with reference to the flowcharts and/or block diagrams of the method, the apparatus (system), and the computer program product according to the embodiments of this disclosure. It should be understood that each block in the flowcharts and/or block diagrams and a combination of blocks in the flowcharts and/or block diagrams can be implemented by computer program instructions. These computer program instructions can be provided to a processor of a general-purpose computer, a dedicated computer, or another programmable data processing apparatus to produce a machine, so that these instructions executed by the processor of the computer or another programmable data processing apparatus enable the implementation of the functions/actions specified in one or more blocks of the flowchart and/or block diagram. Such processor may be, but is not limited to, a general-purpose processor, a dedicated processor, a special application processor, or a field programmable logic circuit. It should be also understood that each block in the block diagrams and/or the flowcharts and a combination of the blocks in the block diagrams and/or the flowcharts may be implemented by a dedicated hardware for executing a specified function or action or may be implemented by a combination of dedicated hardware and computer instructions.

It should be noted that although the foregoing embodiments have been described in this specification, the scope of protection of this disclosure is not limited thereto. Therefore, changes and modifications to the embodiments described herein based on the innovative ideas of this disclosure, equivalent structures or equivalent process transformations made using the content of the specification and accompanying drawings of this disclosure, and direct or indirect application of the above technical solutions to other related technical fields, all fall within the scope of protection of this disclosure.

What is claimed is:

1. A service indication method, executed by a network device being a User Plane Function (UPF) or a base station, wherein the method comprises:
    receiving, from a terminal device of a user, matching information specific to the user, wherein
    the matching information comprises one or more matching values, and one of the matching values corresponds to one or more services or corresponds to one or more service types;
    receiving a downlink message related to data of a target service or a target service type, or receiving a downlink data of the target service or the target service type; wherein the downlink message is triggered by the downlink data of the target service or the target service type; and
    sending a first target matching value to the terminal device through a paging message;
    wherein the first target matching value corresponds to the target service or the target service type;
    wherein before the receiving matching information specific to a user, the method further comprises:
    sending a request message to the terminal device of the user, wherein the request message comprises one or more pieces of service information or one or more pieces of service type information, the service information is used to indicate the service, and the service type information is used to indicate the service type;

or, wherein the method further comprises:

receiving, from the terminal device of the user, service information or service type information corresponding to a currently active service of the terminal device; and based on the service information or service type information corresponding to the currently active service, the matching information, and one of the target service or the target service type, determining to refuse to send the first target matching value.

2. The method according to claim 1, wherein the matching information further comprises at least one piece of the following information corresponding to a second target matching value:

one or more pieces of target service information;

one or more pieces of target service type information;

one or more pieces of high-priority service information, wherein a service corresponding to the high-priority service information is capable of preempting a service corresponding to the target service information;

one or more pieces of high-priority service type information, wherein a service corresponding to the high-priority service type information is capable of preempting a service corresponding to the target service type information;

one or more pieces of low-priority service information, wherein a service corresponding to the low-priority service information is incapable of preempting a service corresponding to the target service information;

one or more pieces of low-priority service type information, wherein a service corresponding to the low-priority service type information is incapable of preempting a service corresponding to the target service type information;

priority information of a service corresponding to the target service information;

priority information of a service type corresponding to the target service type information;

initiator information of a service corresponding to the target service information; and initiator information of a service of a service type corresponding to the target service type information;

wherein the second target matching value is one of the one or more matching values.

3. The method according to claim 1, wherein the service is represented by service information, the service type is represented by service type information, and the service information and/or the service type information comprises at least one of the following:

a name;

an identifier; and rule information.

4. The method according to claim 3, wherein the rule information comprises at least one of the following:

a rule identifier;

one or more IP addresses;

one or more port numbers;

one or more protocol types; and one or more pieces of codec information;

wherein the IP address comprises a number or a wildcard, and the port number comprises a number or a wildcard.

5. The method according to claim 1, wherein the request message further comprises at least one piece of the following information corresponding to target service information or target service type information:

one or more pieces of high-priority service information, wherein a service corresponding to the high-priority service information is capable of preempting a service corresponding to the target service information;

one or more pieces of high-priority service type information, wherein a service corresponding to the high-priority service type information is capable of preempting a service corresponding to the target service type information;

one or more pieces of low-priority service information, wherein a service corresponding to the low-priority service information is incapable of preempting a service corresponding to the target service information;

one or more pieces of low-priority service type information, wherein a service corresponding to the low-priority service type information is incapable of preempting a service corresponding to the target service type information;

priority information of a service corresponding to the target service information;

priority information of a service type corresponding to the target service type information;

initiator information of a service corresponding to the target service information; and initiator information of a service of a service type corresponding to the target service type information.

6. A service indication method, executed by a terminal device, wherein the method comprises:

sending, to a network device being a User Plane Function (UPF) or a base station, matching information specific to a user of the terminal device, wherein the matching information comprises one or more matching values, and one of the matching values corresponds to one or more services or corresponds to one or more service types; and receiving, from the network device, a paging message carrying a first target matching value; wherein the first target matching value corresponds to a target service or a target service type; wherein the paging message is sent when a downlink message related to data of the target service or the target service type or a downlink data of the target service or the target service type is received by the network device; wherein the downlink message is triggered by the downlink data of the target service or the target service type;

wherein before the sending, to a network device, matching information specific to a user of the terminal device, the method further comprises:

receiving a request message sent by the network device, wherein the request message comprises one or more pieces of service information or one or more pieces of service type information, the service information is used to indicate the service, and the service type information is used to indicate the service type; and generating a corresponding matching value for the service information or the service type information;

or, wherein after the sending, to a network device, matching information specific to a user of the terminal device, the method further comprises:

sending, to the network device, service information or service type information corresponding to a currently active service, wherein the service information or service type information corresponding to the currently active service is used by the network device to determine, based on the matching information and the service information or service type information corresponding to the currently active service, whether to send a paging message.

7. The method according to claim 6, wherein after the sending, to a network device, matching information specific to a user of the terminal device, the method further comprises:
displaying prompt information of a target service or a target service type corresponding to the first target matching value; wherein
the target service or the target service type is determined based on the first target matching value and the matching information.

8. The method according to claim 7, wherein after the sending, to a network device, matching information specific to a user of the terminal device, the method further comprises:
determining, based on the first target matching value and the service information or service type information corresponding to a currently active service, whether to respond to the message.

9. The method according to claim 6, wherein the request message further comprises at least one piece of the following information corresponding to target service information or target service type information:
one or more pieces of high-priority service information, wherein a service corresponding to the high-priority service information is capable of preempting a service corresponding to the target service information;
one or more pieces of high-priority service type information, wherein a service corresponding to the high-priority service type information is capable of preempting a service corresponding to the target service type information;
one or more pieces of low-priority service information, wherein a service corresponding to the low-priority service information is incapable of preempting a service corresponding to the target service information;
one or more pieces of low-priority service type information, wherein a service corresponding to the low-priority service type information is incapable of preempting a service corresponding to the target service type information;
priority information of a service corresponding to the target service information;
priority information of a service type corresponding to the target service type information;
initiator information of a service corresponding to the target service information; and
initiator information of a service of a service type corresponding to the target service type information.

10. The method according to claim 6, wherein the matching information further comprises at least one piece of the following information corresponding to a second target matching value:
one or more pieces of target service information;
one or more pieces of target service type information;
one or more pieces of high-priority service information, wherein a service corresponding to the high-priority service information is capable of preempting a service corresponding to the target service information;
one or more pieces of high-priority service type information, wherein a service corresponding to the high-priority service type information is capable of preempting a service corresponding to the target service type information;
one or more pieces of low-priority service information, wherein a service corresponding to the low-priority service information is incapable of preempting a service corresponding to the target service information;
one or more pieces of low-priority service type information, wherein a service corresponding to the low-priority service type information is incapable of preempting a service corresponding to the target service type information;
priority information of a service corresponding to the target service information;
priority information of a service type corresponding to the target service type information;
initiator information of a service corresponding to the target service information; and
initiator information of a service of a service type corresponding to the target service type information;
wherein the second target matching value is one of the one or more matching values.

11. The method according to claim 6, wherein the service is represented by service information, the service type is represented by service type information, and the service information and/or the service type information comprises at least one of the following:
a name;
an identifier; and
rule information;
wherein the rule information comprises at least one of the following:
a rule identifier;
one or more IP addresses;
one or more port numbers;
one or more protocol types; and
one or more pieces of codec information;
wherein the IP address comprises a number or a wildcard, and the port number comprises a number or a wildcard.

12. A terminal device, comprising a memory, a processor, and a computer program stored in the memory and capable of running on the processor, wherein the computer program is executed by the processor to implement:
sending, to a network device being a User Plane Function (UPF) or a base station, matching information specific to a user of the terminal device, wherein
the matching information comprises one or more matching values, and one of the matching values corresponds to one or more services or corresponds to one or more service types;
receiving, from the network device, a paging message carrying a first target matching value;
wherein the first target matching value corresponds to a target service or a target service type;
wherein the paging message is sent when a downlink message related to data of the target service or the target service type or a downlink data of the target service or the target service type is received by the network device; wherein the downlink message is triggered by the downlink data of the target service or the target service type;
wherein the computer program is further executed by the processor to implement:
before the sending, to a network device, matching information specific to a user of the terminal device,
receiving a request message sent by the network device, wherein the request message comprises one or more pieces of service information or one or more pieces of service type information, the service information is used to indicate the service, and the service type information is used to indicate the service type; and generating a corresponding matching value for the service information or the service type information;
or,
wherein the computer program is further executed by the processor to implement:
after the sending, to a network device, matching information specific to a user of the terminal device,
sending, to the network device, service information or service type information corresponding to a currently active service, wherein
the service information or service type information corresponding to the currently active service is used by the network device to determine, based on the matching information and the service information or service type information corresponding to the currently active service, whether to send a paging message.

13. A network device, comprising a memory, a processor, and a computer program stored in the memory and capable of running on the processor, wherein when the computer program is executed by the processor, the steps of the service indication method according to claim 1 are implemented.

14. The terminal device according to claim 12, wherein the service is represented by service information, the service type is represented by service type information, and the service information and/or the service type information comprises at least one of the following:
    a name;
    an identifier; and
    rule information;
    wherein the rule information comprises at least one of the following:
    a rule identifier;
    one or more IP addresses;
    one or more port numbers;
    one or more protocol types; and
    one or more pieces of codec information;
    wherein the IP address comprises a number or a wildcard, and the port number comprises a number or a wildcard.

15. The terminal device according to claim 12, wherein the matching information further comprises at least one piece of the following information corresponding to a second target matching value:
    one or more pieces of target service information;
    one or more pieces of target service type information;
    one or more pieces of high-priority service information, wherein a service corresponding to the high-priority service information is capable of preempting a service corresponding to the target service information;
    one or more pieces of high-priority service type information, wherein a service corresponding to the high-priority service type information is capable of preempting a service corresponding to the target service type information;
    one or more pieces of low-priority service information, wherein a service corresponding to the low-priority service information is incapable of preempting a service corresponding to the target service information;
    one or more pieces of low-priority service type information, wherein a service corresponding to the low-priority service type information is incapable of preempting a service corresponding to the target service type information;
    priority information of a service corresponding to the target service information;
    priority information of a service type corresponding to the target service type information;
    initiator information of a service corresponding to the target service information; and
    initiator information of a service of a service type corresponding to the target service type information;
    wherein the second target matching value is one of the one or more matching values.

16. The terminal device according to claim 12, wherein after the sending, to a network device, matching information specific to a user of the terminal device, the computer program is further executed by the processor to implement:
    displaying prompt information of a target service or a target service type corresponding to the first target matching value; wherein
    the target service or the target service type is determined based on the first target matching value and the matching information.

17. The terminal device according to claim 16, wherein the computer program is further executed by the processor to implement:
    after the sending, to a network device, matching information specific to a user of the terminal device,
    determining, based on the first target matching value and the service information or service type information corresponding to a currently active service, whether to respond to the message.

18. The terminal device according to claim 12, wherein the request message further comprises at least one piece of the following information corresponding to target service information or target service type information:
    one or more pieces of high-priority service information, wherein a service corresponding to the high-priority service information is capable of preempting a service corresponding to the target service information;
    one or more pieces of high-priority service type information, wherein a service corresponding to the high-priority service type information is capable of preempting a service corresponding to the target service type information;
    one or more pieces of low-priority service information, wherein a service corresponding to the low-priority service information is incapable of preempting a service corresponding to the target service information;
    one or more pieces of low-priority service type information, wherein a service corresponding to the low-priority service type information is incapable of preempting a service corresponding to the target service type information;
    priority information of a service corresponding to the target service information;
    priority information of a service type corresponding to the target service type information;
    initiator information of a service corresponding to the target service information; and
    initiator information of a service of a service type corresponding to the target service type information.

* * * * *